(12) United States Patent
Suzuki et al.

(10) Patent No.: US 7,980,375 B2
(45) Date of Patent: Jul. 19, 2011

(54) FRICTION PLATE FOR WET-TYPE MULTIPLATE CLUTCH

(75) Inventors: Hideaki Suzuki, Shizuoka-ken (JP); Hiroyuki Kinpara, Shizuoka-ken (JP); Masahiro Kobayashi, Shizuoka-ken (JP); Tsuyoshi Hirayanagi, Shizuoka-ken (JP)

(73) Assignee: NSK-Warner K.K., Tokyo (JP)

( * ) Notice: Subject to any disclaimer, the term of this patent is extended or adjusted under 35 U.S.C. 154(b) by 704 days.

(21) Appl. No.: 12/038,027

(22) Filed: Feb. 27, 2008

(65) Prior Publication Data
US 2008/0223687 A1    Sep. 18, 2008

(30) Foreign Application Priority Data
Mar. 15, 2007   (JP) ................. 2007-066664

(51) Int. Cl.
F16D 13/74    (2006.01)

(52) U.S. Cl. ................. 192/107 R; 192/113.36

(58) Field of Classification Search ............. 192/113.36
See application file for complete search history.

(56) References Cited

U.S. PATENT DOCUMENTS

| 4,726,455 | A | * | 2/1988 | East .................... 192/107 R |
| 6,062,367 | A | | 5/2000 | Hirayanagi et al. |
| 7,172,062 | B2 | | 2/2007 | Kitahara et al. |
| 2007/0017773 | A1 | | 1/2007 | Suzuki et al. |
| 2007/0102258 | A1 | * | 5/2007 | Miyazaki et al. ........ 192/113.36 |
| 2007/0199794 | A1 | | 8/2007 | Miyazaki et al. |
| 2008/0156611 | A1 | * | 7/2008 | Hirayanagi ............. 192/107 R |
| 2008/0179161 | A1 | * | 7/2008 | Kobayashi et al. ....... 192/107 R |
| 2008/0179162 | A1 | * | 7/2008 | Kobayashi et al. ....... 192/107 R |
| 2008/0185256 | A1 | * | 8/2008 | Kobayashi et al. ....... 192/107 R |
| 2008/0190727 | A1 | * | 8/2008 | Kobayashi et al. ....... 192/107 R |

FOREIGN PATENT DOCUMENTS

| JP | 11-141570 | 5/1999 |
| JP | 2005-076759 | 3/2005 |

* cited by examiner

*Primary Examiner* — Richard M. Lorence
(74) *Attorney, Agent, or Firm* — Kenealy Vaidya LLP

(57) ABSTRACT

A friction plate for a wet-type multiplate clutch is provided with a core plate and friction linings bonded on opposite sides of the core plate, respectively. Each of the friction linings is composed of plural segment pieces each having at least one first oil groove and at least one second oil groove. The first oil groove opens to a radially-inner side of the friction plate and has a closed end portion located in a radially-intermediate part of the friction lining, and the second oil groove opens to a radially-outer side of the friction plate and has a closed end portion located in another radially-intermediate part of the friction lining. The second oil groove has an opening flared outwardly in a radial direction.

10 Claims, 5 Drawing Sheets

# FRICTION PLATE FOR WET-TYPE MULTIPLATE CLUTCH

CROSS-REFERENCE TO RELATED APPLICATION

This application claims the priority of Japanese Patent Application 2007-066664 filed Mar. 15, 2007, which is incorporated herein by reference.

BACKGROUND

1. Field

The presently disclosed subject matter relates to a friction plate for a wet-type multiplate clutch useful as a clutch, brake or the like in an automatic transmission.

2. Description of the Related Art

FIG. 1 is a cross-sectional view illustrating the fundamental construction of a wet-type multiplate clutch 10. FIG. 1 shows a clutch casing 21, a counterpart hub 22 to which a rotary torque is transmitted, a spline groove 23 formed on the clutch casing 21, a spline groove 24 formed on the hub 22, a piston 25 for pressing separator plates 30 and friction plates 40 against a backing plate 26, a snap ring 27 supporting the backing plate 26, and a sealing ring 28 for the piston 25. The separator plates 30 are maintained in fitting engagement with the spline groove 23, while the friction plates 40 are maintained in fitting engagement with the spline groove 24.

In recent years, there is an ever-increasing demand for improvements in the fuel economy of automobiles. Keeping in step with this trend, there is an outstanding demand for a further reduction in drag toque between friction plates and separator plates during idling of a clutch in an automatic transmission.

A conventional clutch is equipped with friction plates provided with friction linings, each of which has one or more oil grooves having closed end portions to separate the friction plates from their associated separator plates during idling of the clutch and also has one or more oil passages extending radially through the friction lining to feed lube oil onto a friction surface for the prevention of seizure during engagement of the clutch (see, for example, JP-A-11-141570 and JP-A-2005-076759).

To improve the shift response in an attempt to make not only an improvement in fuel economy but also improvements in engine performance, the clearances between friction plates and their associated separator plates have increasingly become smaller recently, tending to result in a greater drag torque due to intervening oil films during idling.

With such conventional friction plates, sufficient drainage of lube oil is sometimes not feasible on their friction surfaces, thereby failing to satisfactorily meet the demand for a further reduction in drag torque.

BRIEF SUMMARY OF THE DISCLOSED SUBJECT MATTER

In one aspect of the presently disclosed subject matter, there is thus provided a friction plate for a wet-type multiplate clutch, said friction plate being provided with a core plate and friction linings bonded on opposite sides of the core plate, respectively, each of the friction linings being composed of plural segment pieces bonded at angular intervals on the corresponding one of the opposite sides, said segment pieces each having at least one first oil groove and at least one second oil groove, said first oil groove opening to a radially-inner side of its corresponding segment piece and having a closed end portion located in a radially-intermediate part of the corresponding segment piece, and said second oil groove opening to a radially-outer side of the corresponding segment piece and having a closed end portion located in another radially-intermediate part of the corresponding segment piece, wherein the second oil groove has an opening flared outwardly in a radial direction.

By such second oil grooves, lube oil is smoothly drained to the radially-outer side so that during idling of a clutch, a drag torque is reduced. This effect of the second oil grooves is exhibited high especially in a low-speed rotation range. By providing the second oil grooves with the openings flared outwardly in the radial direction, the effect of the second grooves can also be exhibited high in a high-speed rotation range. Owing to the above-described construction, the presently disclosed subject matter has made it possible to sufficiently reduce a drag torque even during rotation at significantly high speed and also to avoid grabbing in an initial stage of engagement of the clutch.

DETAILED DESCRIPTION OF EXEMPLARY EMBODIMENTS

When the first oil grooves are gradually reduced in width toward their end portions, the effect to separate the friction plate from its associated separator plates is increased. When the second oil grooves are gradually reduced in width toward their end portions, the lube-oil drainage performance is increased.

Owing to this increased lube-oil drainage performance, the idling drag torque is reduced, and at the same time, grabbing may take place in the initial stage of engagement of the clutch, thereby possibly causing the problem of a shift shock. In such a case, the first oil grooves can be provided at their end portions with oil pockets, which then serve as cushions to prevent grabbing.

Figure 1:
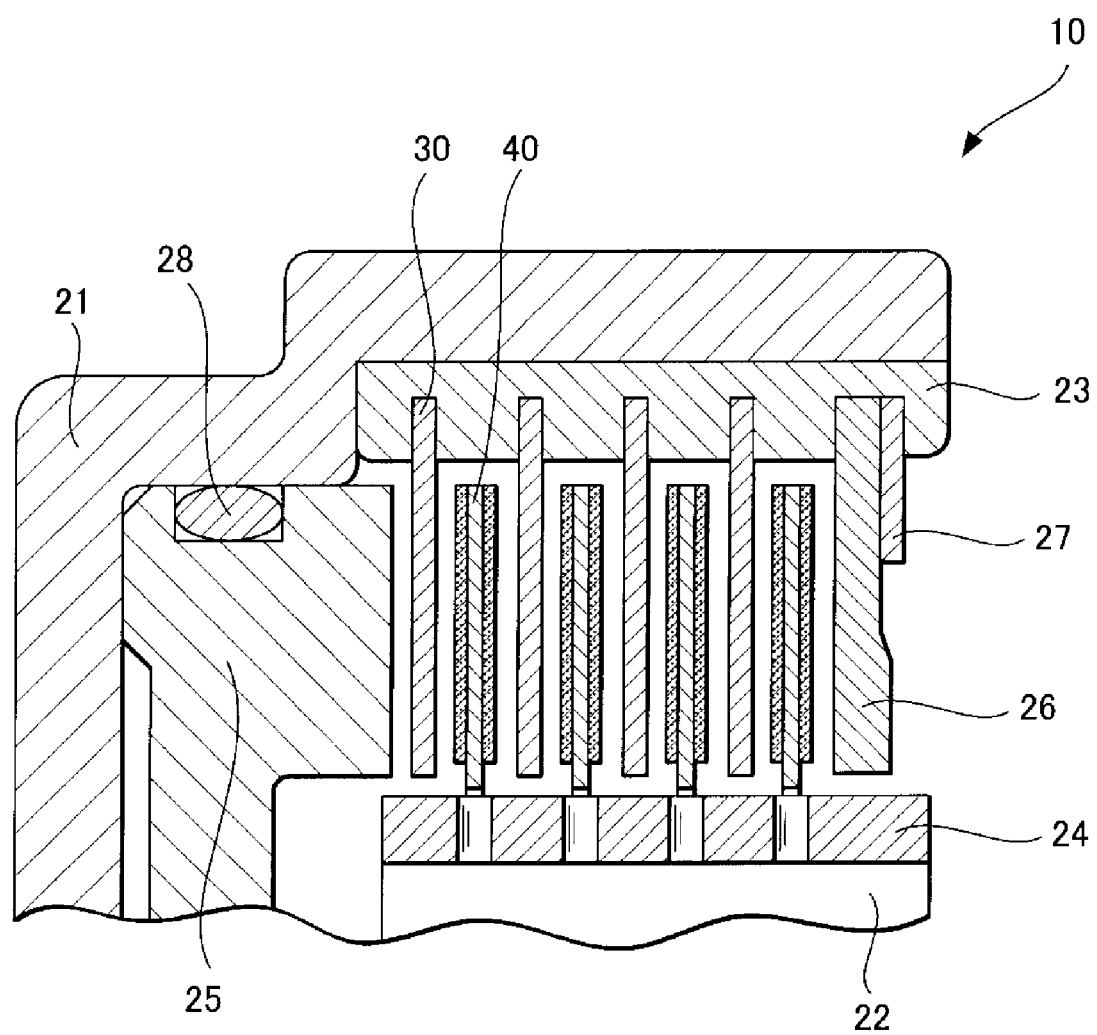
FIG. 1 is a cross-sectional view illustrating the fundamental construction of a wet-type multiplate clutch.
Figure 2:
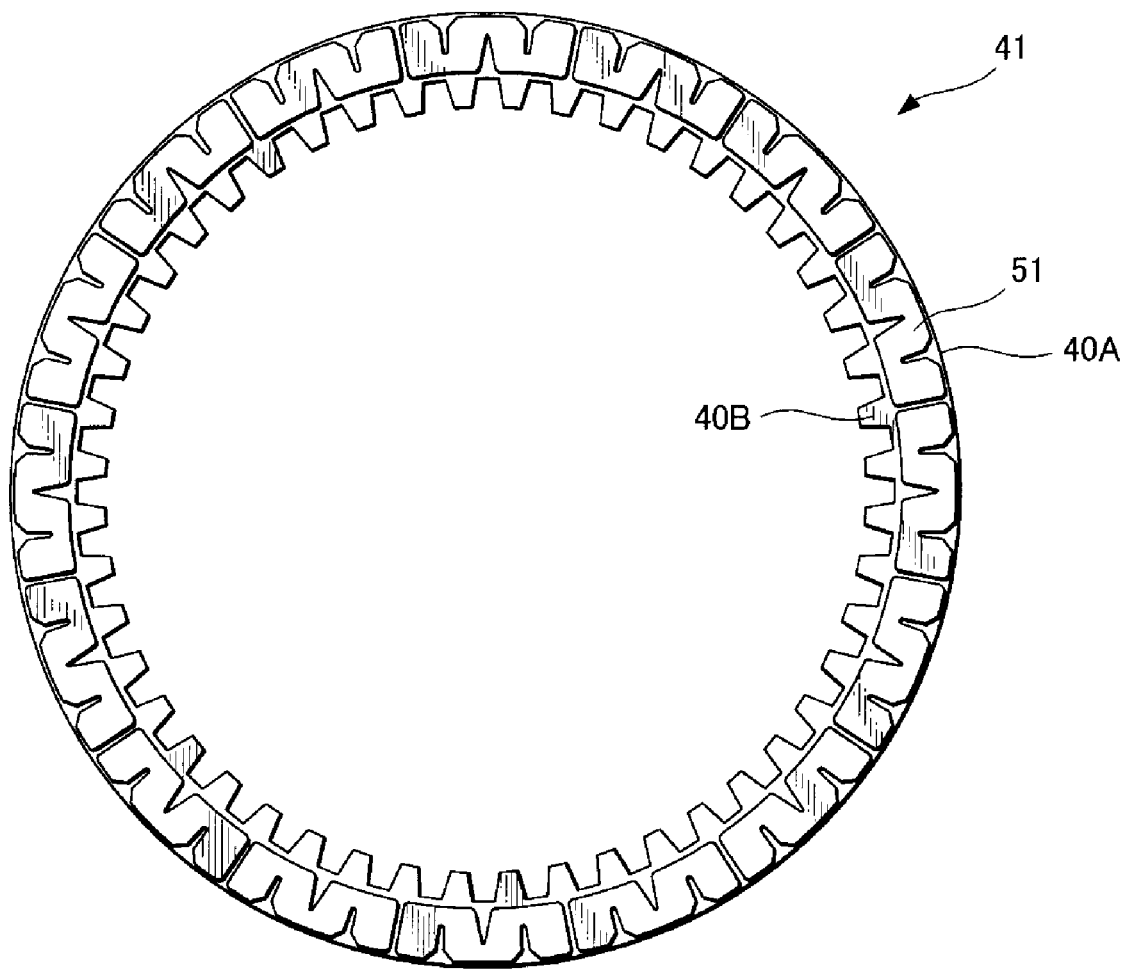
FIG. 2 is a front view of a friction plate according to a first embodiment of the presently disclosed subject matter.
Figure 3:
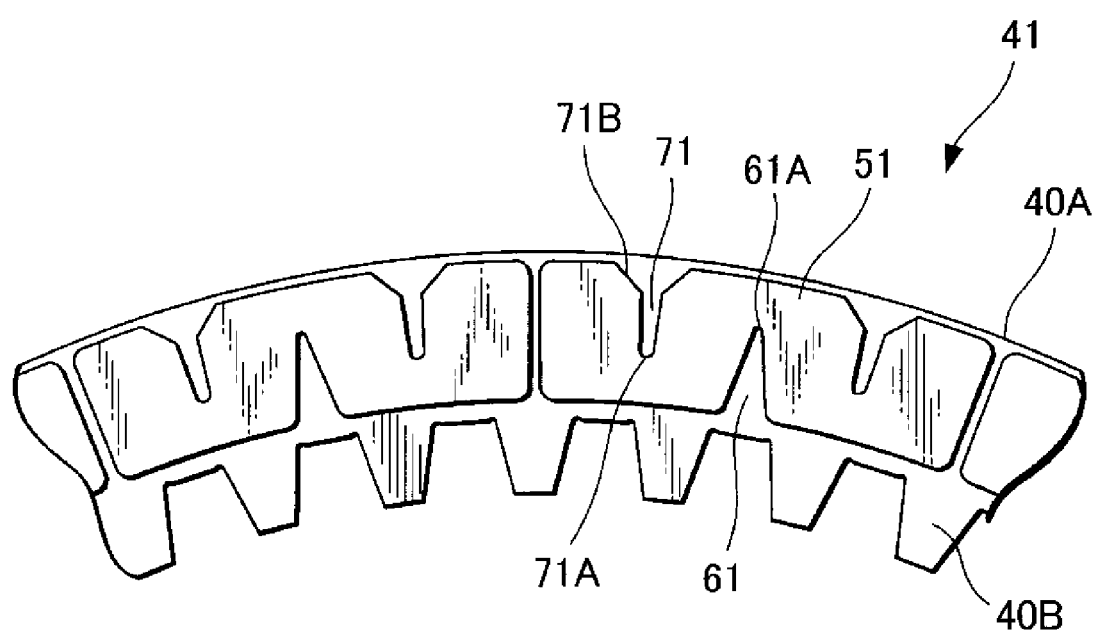
FIG. 3 is an enlarged fragmentary front view of the friction plate of FIG. 2.

FIG. 2 is a front view of a friction plate 41 according to the first embodiment of the presently disclosed subject matter, and FIG. 3 is an enlarged fragmentary view of the friction plate 41 of FIG. 2. FIGS. 2 and 3 show a core plate 40A, segment pieces 51 of a friction lining, spline teeth 40B to be brought into fitting engagement with a counterpart hub, first oil grooves 61 and their end portions 61A, and second oil grooves 71 and their end portions 71A.

As illustrated in FIG. 3, each second oil groove 71 is provided with an opening 71B flared outwardly in a radial direction. As the rotational speed of a clutch becomes higher, a negative pressure is produced between plates. Under this negative pressure, air is drawn onto friction surfaces to reduce a drag torque. The outwardly flared configuration of the opening 71B of each second oil groove 71 facilitates the draw of air from the radially-outer side of the plates, so that more air is drawn onto the friction surfaces to reduce a drag torque.

If the openings 71B are formed too wide, the friction area of the friction lining decreases, thereby possibly developing a problem in the heat resistance of the friction lining. When the openings 71B are formed substantially wide, the remaining portions of the second oil grooves 71 may be formed narrow to overcome the problem of heat resistance.

Figure 4:
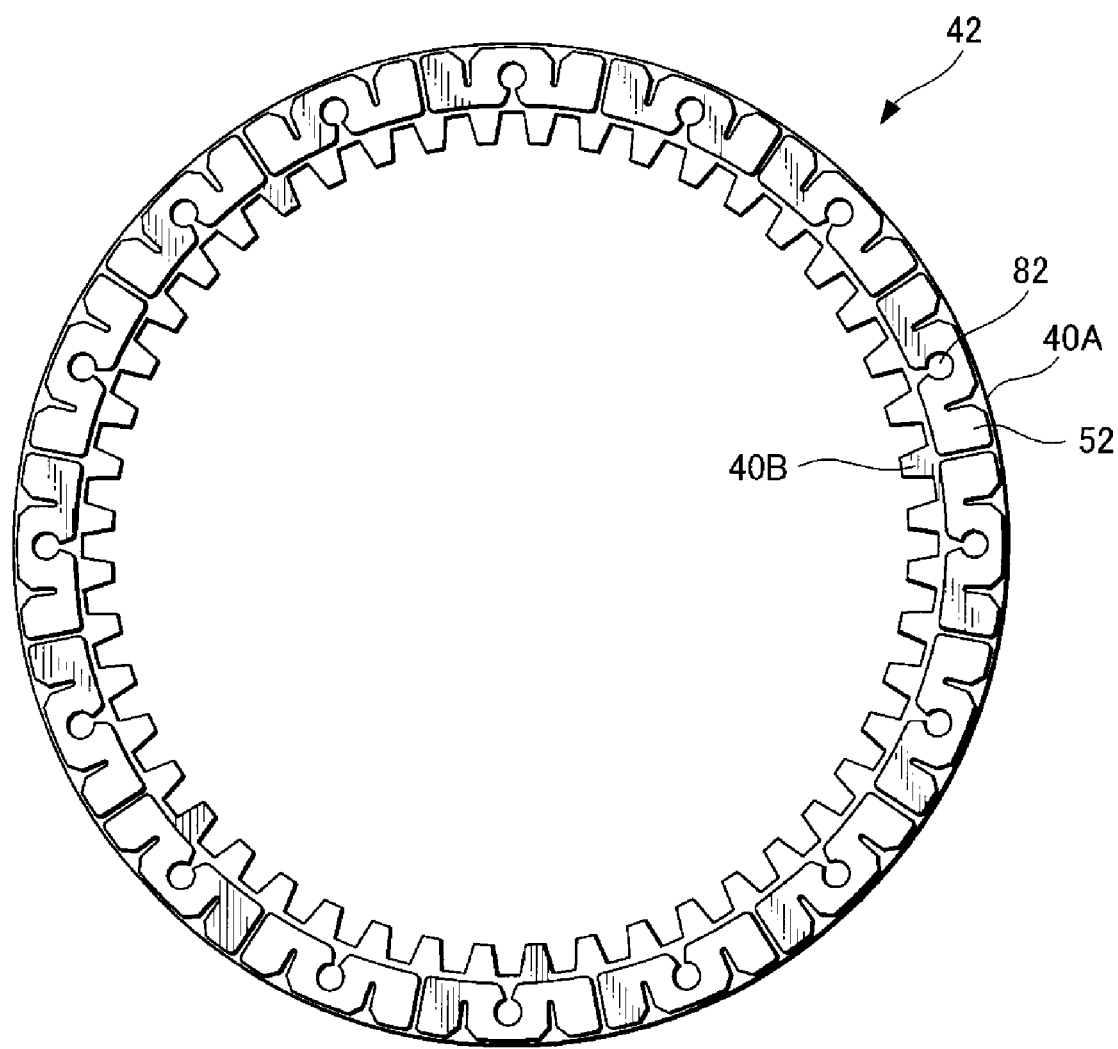
FIG. 4 is a front view of a friction plate according to a second embodiment of the presently disclosed subject matter.
Figure 5:
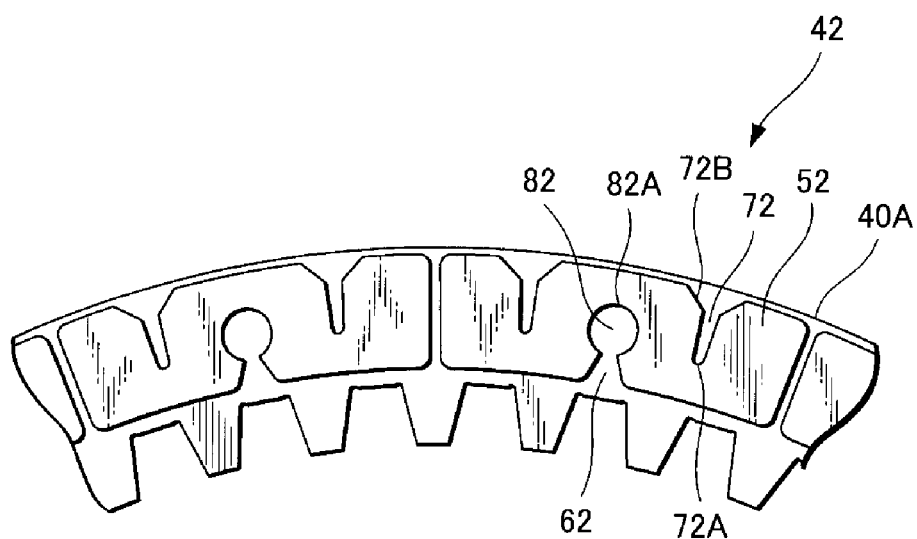
FIG. 5 is an enlarged fragmentary front view of the friction plate of FIG. 4.

FIG. 4 is a front view similar to FIG. 2, but illustrates a friction plate 42 according to the second embodiment. FIG. 5 is an enlarged fragmentary view of the friction plate 42 of FIG. 4. FIGS. 4 and 5 depict a core plate 40A, segment pieces 52 of a friction lining, spline teeth 40B to be brought into fitting engagement with a counterpart hub, first oil grooves 62, and second oil grooves 72 and their end portions 72A.

As illustrated in FIG. 5, each second oil groove 72 is provided with an opening 72B flared outwardly in a radial direction. As the rotational speed of a clutch becomes higher, a negative pressure is produced between plates. Under this negative pressure, air is drawn onto friction surfaces to reduce a drag torque. The outwardly flared configuration of the opening 72B of each second oil groove 72 facilitates the draw of air from the radially-outer side of the plates, so that more air is drawn onto the friction surfaces to reduce a drag torque.

Quick drainage of lube oil from the friction surfaces is effective for the reduction of a drag torque during idling of the clutch, but on the other hand, involves a potential problem that grabbing may take place in the initial stage of engagement of the clutch and a shift shock may hence be produced. In the second embodiment, the first oil grooves 62 are, therefore, provided at their end portions with oil pockets 82, respectively, so that cushioning effects are produced to prevent grabbing in the initial stage of engagement of the clutch. Accordingly, friction plates according to the second embodiment are provided with such high quality that they do not produce large drag torques while assuring high durability.

In the first embodiment, a flow of lube oil can be promoted further when the closed end portion 61A of each first oil groove 61 and the closed end portion 71A of each second oil grooves 71 are located beyond a radial center line of the corresponding segment piece, respectively. In the second embodiment, a flow of lube oil can be similarly promoted further when a radially-outer end portion 82A of each oil pocket 82 and the closed end portion 72A of each second oil groove 72 are located beyond a radial center line of the corresponding segment piece, respectively.

Figure 6:
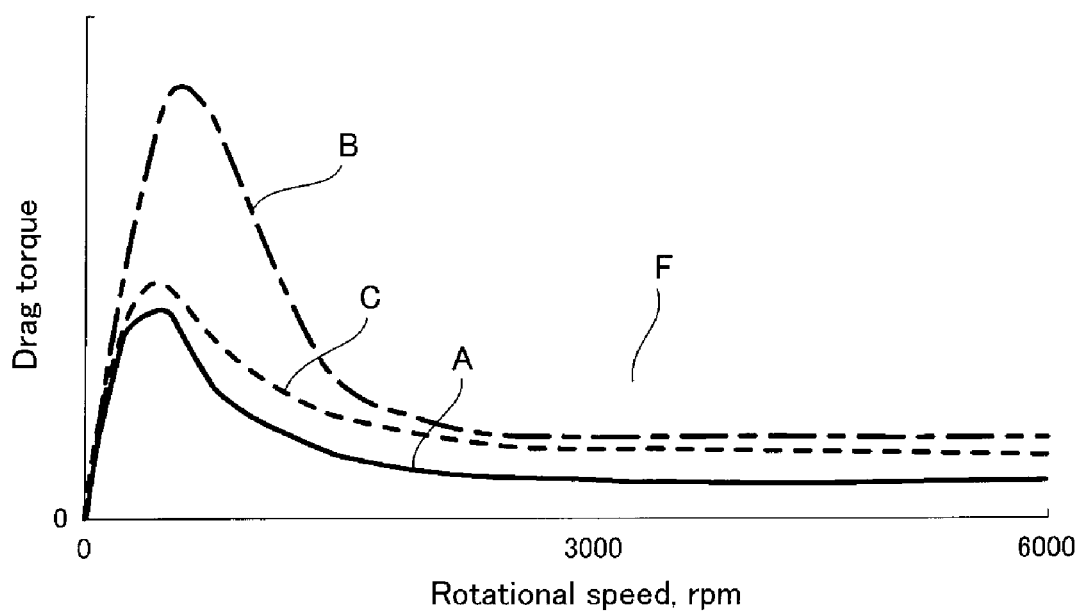
FIG. 6 is a rotational speed-drag torque graph illustrating advantageous effects of friction plates according to the first embodiment of the presently disclosed subject matter.

FIG. 6 diagrammatically illustrates advantageous effects of the presently disclosed subject matter, in which produced drag torque is plotted along the ordinate while rotational speed is plotted along the abscissa. A solid line A indicates rotational speed-drag torque characteristics of a clutch equipped with friction plates according to the first embodiment of the presently disclosed subject matter, an alternate long-and-short dash line B indicates rotational speed-drag torque characteristics of a clutch equipped with the friction plates disclosed in JP-A-11-141570, and a dashed line C indicates rotational speed-drag torque characteristics of a clutch equipped with friction plates having friction linings in the form of W-shaped segments. Rotational speed-drag torque characteristics similar to those available from the clutch equipped with friction plates according to the first embodiment of the presently disclosed subject matter can be obtained by a clutch equipped with friction plates according to the second embodiment of the presently disclosed subject matter.

In FIG. 6, the drag torque becomes low from a rotational speed indicated by letter F (approx. 3,000 rpm) as a result of draw of air. In this figure, the differences in drag torque among the lines A, B and C may not look significant at first glance. In view of the increasing tendency toward a higher rotational speed, however, the effects of the presently disclosed subject matter to reduce the drag torque are highly valuable.

It will be apparent to those skilled in the art that various modifications and variations can be made in the presently disclosed subject matter without departing from the spirit or scope of the invention. Thus, it is intended that the presently disclosed subject matter cover the modifications and variations of this invention provided they come within the scope of the appended claims and their equivalents. All related or conventional art references described above are hereby incorporated in their entirety by reference.

The invention claimed is:

1. A friction plate for a wet-type multiplate clutch, said friction plate comprising:
    a core plate; and
    friction linings bonded on opposite sides of said core plate, respectively, each of said friction linings being composed of plural segment pieces bonded at angular intervals on a corresponding one of said opposite sides, said segment pieces each having at least one first oil groove and at least one second oil groove, said first oil groove opening to a radially-inner side of a corresponding segment piece and having a closed end portion located in a radially-intermediate part of the corresponding segment piece, and said second oil groove opening to a radially-outer side of the corresponding segment piece and having a closed end portion located in another radially-intermediate part of the corresponding segment piece, wherein
    said second oil groove has an opening flared outwardly in a radial direction.

2. A friction plate according to claim 1, wherein said second oil groove becomes narrower from a flared opening toward said closed end portion of said second oil groove.

3. A friction plate according to claim 1, wherein said first oil groove becomes narrower from an opening on said radially-inner side toward said closed end portion of said first oil groove.

4. A friction plate according to claim 1, wherein said closed end portions of said first and second oil grooves are located radially outward and radially inward, respectively, of a radial center line of the corresponding segment piece.

5. A friction plate according to claim 1, wherein said first oil groove includes an oil pocket located at said closed end portion of said first oil groove.

6. A friction plate according to claim 5, wherein a radially outer end portion of said oil pocket of said first oil groove and said closed end portion of said second oil groove are located radially outward and radially inward, respectively, of a radial center line of the corresponding segment piece.

7. A friction plate according to claim 1, wherein the opening of said second oil groove is defined by a first wall and a second wall that oppose each other and extend substantially linearly outwardly along a first length and that each include a second length that extends substantially linearly outwardly and at an angle with respect to the first length along the second length to form the opening flared outwardly in a radial direction.

8. A friction plate according to claim 7, wherein an end of the second length of each of the first wall and the second wall terminates at an outer peripheral wall of the friction plate.

9. A friction plate according to claim 1, wherein the opening flared outwardly in a radial direction is defined by a first substantially linear wall and a second substantially linear wall, the first substantially linear wall being opposed from and angled away from second substantially linear wall.

10. A friction plate according to claim 1, wherein the opening flared outwardly of said second oil groove is configured in a substantial Y-shape in the radial direction.

* * * * *